United States Patent
Mortzheim

(10) Patent No.: US 7,744,092 B2
(45) Date of Patent: Jun. 29, 2010

(54) METHODS AND APPARATUS TO FACILITATE SEALING IN ROTARY MACHINES

(75) Inventor: Jason Paul Mortzheim, Gloversville, NY (US)

(73) Assignee: General Electric Company, Schenectady, NY (US)

( * ) Notice: Subject to any disclaimer, the term of this patent is extended or adjusted under 35 U.S.C. 154(b) by 422 days.

(21) Appl. No.: 11/796,927

(22) Filed: Apr. 30, 2007

(65) Prior Publication Data

US 2008/0265514 A1 Oct. 30, 2008

(51) Int. Cl.
 *F16J 15/44* (2006.01)
(52) U.S. Cl. .............. 277/303; 277/355; 415/174.1
(58) Field of Classification Search ........... 277/303, 277/355, 411, 412; 415/173.2, 173.3, 174.1, 415/174.2, 230, 231
 See application file for complete search history.

(56) References Cited

U.S. PATENT DOCUMENTS

| | | | |
|---|---|---|---|
| 5,135,237 | A | 8/1992 | Flower |
| 6,343,792 | B1 | 2/2002 | Shinohara et al. |
| 6,550,777 | B2 * | 4/2003 | Turnquist et al. ........... 277/355 |
| 6,601,853 | B2 | 8/2003 | Inoue |
| 6,644,667 | B2 | 11/2003 | Grondahl |
| 6,786,487 | B2 * | 9/2004 | Dinc et al. ................... 277/355 |
| 6,808,179 | B1 * | 10/2004 | Bhattacharyya et al. ..... 277/348 |
| 6,874,788 | B2 | 4/2005 | Kono |
| 7,249,769 | B2 * | 7/2007 | Webster ....................... 277/411 |
| 2002/0130469 | A1 * | 9/2002 | Kono .......................... 277/355 |
| 2002/0190474 | A1 * | 12/2002 | Turnquist et al. ........... 277/355 |
| 2003/0062686 | A1 | 4/2003 | Uehara et al. |
| 2003/0102630 | A1 * | 6/2003 | Dinc et al. ................... 277/355 |
| 2004/0150165 | A1 * | 8/2004 | Grondahl .................... 277/355 |
| 2008/0136112 | A1 * | 6/2008 | Addis ......................... 277/355 |

OTHER PUBLICATIONS

Nakane, H. et al., The Development of High Performance Leaf Seals, Proceedings of ASME TURBO EXPO 2002, Jun. 3-6, 2002, Amsterdam, Netherlands, pp. 1-9.
Pending U.S. Appl. No. 11/796,815, filed Apr. 30, 2007, Nikhil Kumar Verma et al., Methods and Apparatus to Facilitate Sealing in Rotary Machines.

* cited by examiner

*Primary Examiner*—Thomas B Will
*Assistant Examiner*—Gilbert Y Lee
(74) *Attorney, Agent, or Firm*—Armstrong Teasdale LLP

(57) ABSTRACT

A method and seal assembly for sealing a rotary machine including a rotary component and a stationary component is provided. The method includes providing a plurality of flexible leaf plates in an opening defined between a pair of spaced walls that include an adjustable front wall and an adjustable back wall that is opposed to the front wall. The method also includes adjusting a width of the opening by axially adjusting at least one of the front and back walls with respect to a central rotational axis of the rotary component.

13 Claims, 4 Drawing Sheets

METHODS AND APPARATUS TO FACILITATE SEALING IN ROTARY MACHINES

BACKGROUND OF THE INVENTION

This application relates generally to rotary machines and more particularly, to methods and apparatus for sealing a rotary machine.

At least some known rotary machines such as, but not limited to steam turbines and gas turbines, include a plurality of seal assemblies in a steam-flow path or an airflow path to facilitate increasing operating efficiency of the rotary machine. At least some known seal assemblies are positioned between a stationary component and a rotary component and/or between a high-pressure area and a low-pressure area. For example, to facilitate thrust balancing, a turbine rotor may be sealed relative to a cooperating stator to facilitate maintaining a higher pressure in a forward direction of the rotor as compared to a lower pressure in an aft direction of the rotor.

At least some known seal assemblies include seals such as, but not limited to, brush seals, leaf seals, and/or shingle seals. Known leaf and shingle seals include an array of multi-layered flexible plates, known as leaf plates, which are aligned and inclined in a circumferential direction about a central rotational axis of a rotary component. More specifically, the leaf plates are generally arranged to engage and disengage the rotor or rotary component during various operating stages of the rotary machine. For example, during shut down of the turbine engine, leaf tips of the leaf plates are generally in contact with a rotary component. During rotation of the rotary component, various forces generally act on the leaf plates to cause upward and downward deflection of the plates. Such forces include, but are not limited to, leaf/rotor contact forces, hydrodynamic lifting forces, and differential pressure forces. Leaf/rotor contact forces are generated by an initial contact between the leaf plate and the rotary component. Hydrodynamic lifting forces are generated by rotation of the rotary component. Differential pressure forces include differential pressure lifting forces and radially inward blow-down forces that are generated by differential pressure changes, a weight of the leaf plate, and/or an inclination of the leaf plate. Because a negligible amount of clearance between leaf tips and the rotary component facilitates reducing wearing of the leaf plates, a balance or leveraging between such forces acting on the leaf plates is desirable to ensure that the leaf tips are disengaged from the rotary component during rotor rotation.

At least some known seal assemblies include seal housing and an adjustable clearance control mechanism that is coupled to the stationary component. The seal housing includes at least a high-pressure-side front wall that is separated from a low-pressure-side back wall by a fixed gap that is set by the manufacturer. The clearance control mechanism actuates the seal housing including the leaf plates to adjust a clearance between leaf tips and a rotary component.

Such seal assemblies are used to reduce air leakage through the clearance and maintain a differential pressure between various machine components by radially actuating the leaf plates. However, within such seals, the high-pressure-side front wall and the low-pressure-side back wall of the seal housing generally experience substantially no pressure drop. Rather, a pressure drop is mainly experienced by leaf plates of the seal assembly. Therefore, any adjustment of the seal housing including the leaf plates generally requires a mechanism that can overcome extreme forces such as, but not limited to, differential pressure forces and frictional forces. Because of radial adjustments to the seal assembly, known clearance control mechanisms may reduce the seal assembly life and increase the overall maintenance cost of the machine.

BRIEF DESCRIPTION OF THE INVENTION

In one aspect, a method for sealing a rotary machine including a rotary component and a stationary component is provided. The method includes providing a plurality of flexible leaf plates in an opening defined between a pair of spaced walls that include an adjustable front wall and an adjustable back wall that is opposed to the front wall. The method also includes adjusting a width of the opening by axially adjusting at least one of the front and back walls with respect to a central rotational axis of the rotary component.

In another aspect, a seal assembly for a rotary machine including a rotary component and a stationary component is provided. The seal assembly includes a pair of spaced walls comprising a moveable front wall and a moveable back wall. The back wall is opposite the front wall such that an opening is defined therebetween. The seal assembly also includes a plurality of flexible leaf plates disposed in the opening. The front and back walls are axially adjustable with respect to a central rotational axis of the rotary component to selectively adjust a width of the opening.

In another aspect, a rotary machine is provided. The rotary machine includes a stationary component fixed against rotation and a rotary component including an axis of rotation. The rotary component opposes the stationary component. The rotary machine also includes a seal assembly coupled to the stationary component. The seal assembly includes a pair of spaced walls comprising a moveable front wall and a moveable back wall. The back wall is opposite the front wall such that an opening is defined therebetween. The seal assembly also includes a plurality of flexible leaf plates disposed in the opening. The front and back walls are axially adjustable with respect to a central rotational axis of the rotary component to selectively adjust a width of the opening.

DETAILED DESCRIPTION OF THE INVENTION

Figure 1:
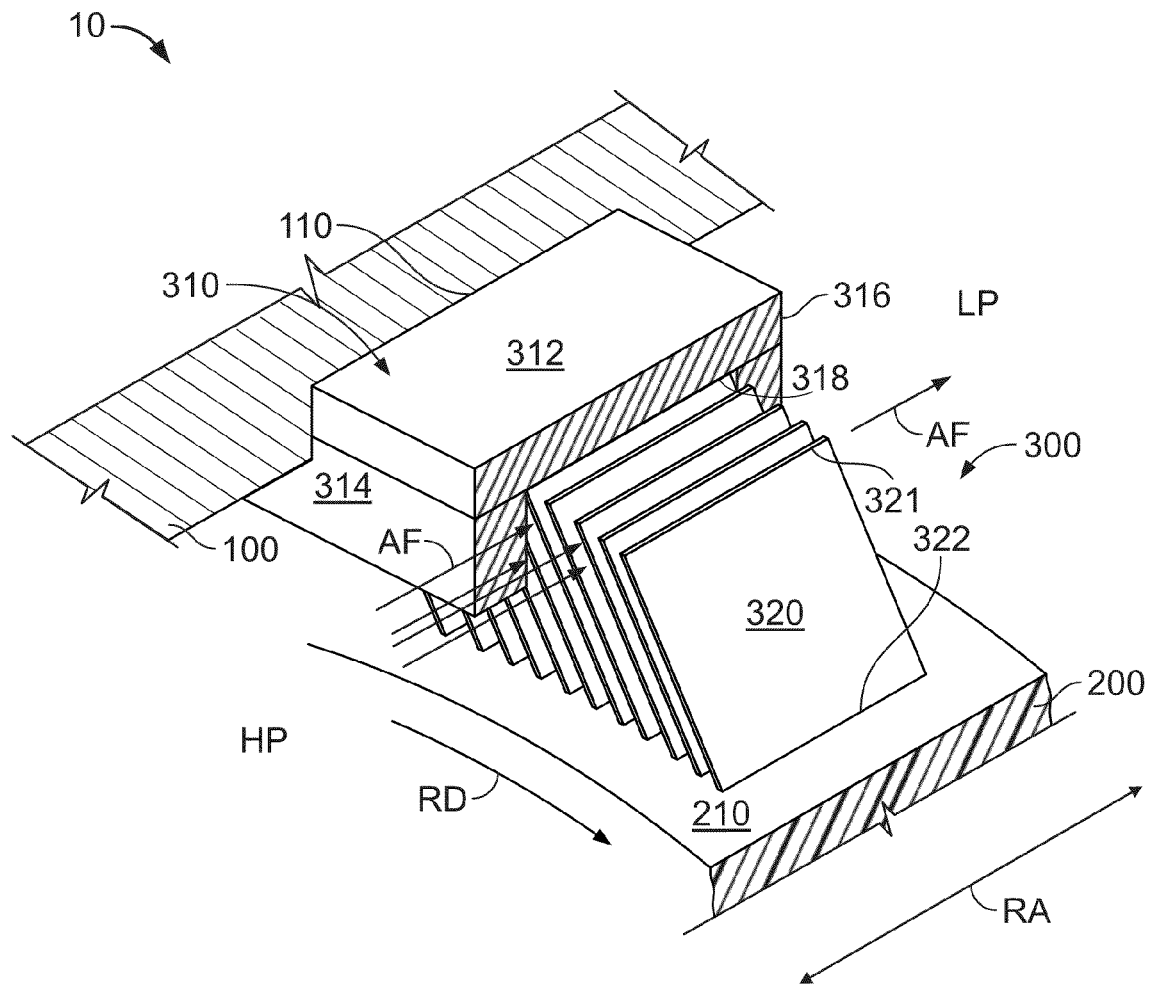
FIG. 1 is a partial perspective view of a portion of an exemplary rotary machine including a seal assembly.

The exemplary methods and apparatus described herein overcome the mechanical disadvantages of known seal assemblies such as, but not limited to radially-adjustable seal assemblies.

Various exemplary details are described herein, with reference to FIGS. 1-7, wherein identical reference numerals refer to identical parts.

It should be appreciated that "axial" and "axially" are used throughout this application to refer to directions and orientations extending from the left to the right of the page, and vice versa, for the ease of understanding. It should also be appreciated that "axial" and "axially" are used to reference directions and orientations substantially parallel to a central rotational axis of the rotary machine.

It should be appreciated that "radial" and "radially" are used throughout this application to refer to directions and orientations extending from the bottom to the top of the page, and vice versa, for the ease of understanding. It should also be appreciated that "radial" and "radially" are used to reference directions and orientations substantially perpendicular to the "axial" and "axially" disposed features.

It should also be appreciated that "circumferential" and "circumferentially" are used throughout this application to refer to directions that circumscribe the central rotational axis of the rotary machine.

FIG. 1 illustrates a partial perspective view of an exemplary rotary machine 10. In the exemplary embodiment, rotary machine 10 includes a stationary component 100, a rotary component 200, and a seal assembly 300. For example, rotary machine 10 may be a gas or steam turbine engine that includes a fixed stator and a rotatable rotor. However, it should be appreciated that rotary machine 10 may be any machine such as, but not limited to, a gas or steam turbine engine, in which power is supplied to a rotary component.

Stationary component 100 includes a cavity 110 defined therein, and is positioned substantially coaxial with respect to rotary component 200 such that a central axis of stationary component 100 is substantially coaxial with a central rotational axis RA of rotary component 200. Moreover, in the exemplary embodiment, stationary component 100 is spaced radially from an outer surface 210 of rotary component 200. It should also be appreciated that stationary component 100 includes any component that is fixed against rotation with respect to other components within rotary machine 10, and that rotary component 200 includes any component that rotates about a central rotational axis.

In the exemplary embodiment, seal assembly 300 includes a seal housing 310 and a plurality of leaf plates 320. Seal housing 310 includes a top wall 312 and two substantially parallel front and back walls 314 and 316 that define a cavity 318 therebetween. Leaf plates 320 are mounted to top wall 312 such that leaf plates 320 are partially positioned, aligned, and inclined within cavity 318. Seal assembly 300 is positioned between stationary component 100 and rotary component 200 to facilitate sealing a gap defined therebetween. Although seal assembly 300 is described as including seal housing 310 for mounting leaf plates 320 to stationary component 100, it should be appreciated that top wall 312 of seal housing 310 may be removed, such that front wall 314, back wall 316, and leaf plates 320 are mounted directly to cavity 110.

Figure 2:
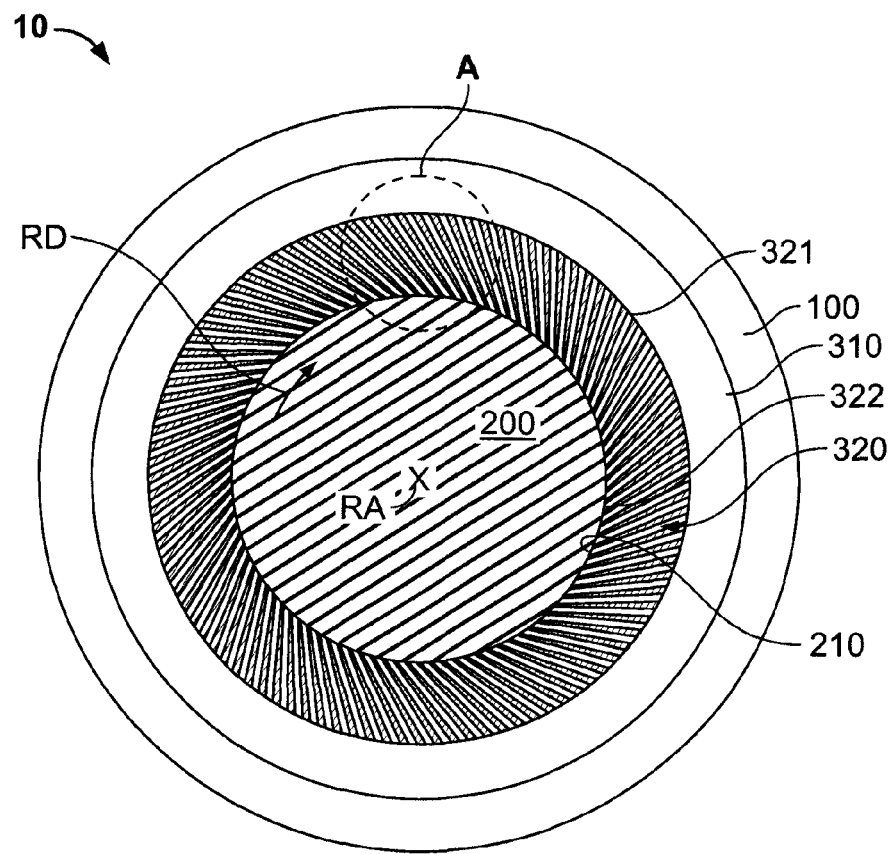
FIG. 2 is a cross-sectional view of the seal assembly shown in FIG. 1.

FIG. 2 is a cross-sectional view of seal assembly 300. In the exemplary embodiment, leaf plates 320 are aligned and inclined in a circumferential direction about central rotational axis RA of rotary component 200. Radially outward end portions 321 of leaf plates 320 are spaced adjacent to stationary component 100 and radially inward leaf tips 322 of leaf plates 320 are densely spaced adjacent to outer surface 210 of rotary component 200.

As a result, a minimal amount of steam or air leakage may flow through seal assembly 300 to facilitate performing functions such as, but not limited to, purging cavities, cooling components, and/or inhibiting hot steam or air from contacting certain components of the rotary machine 100. For example, seal assembly 300 enables airflow AF (shown in FIG. 1) to be channeled between leaf plates 320 closer to radially outward end portions 321 than to leaf tips 322. As such, leaf plates 320 facilitate controlling an amount of air or steam leakage flowing in a desired path through seal assembly 300.

Figure 3:
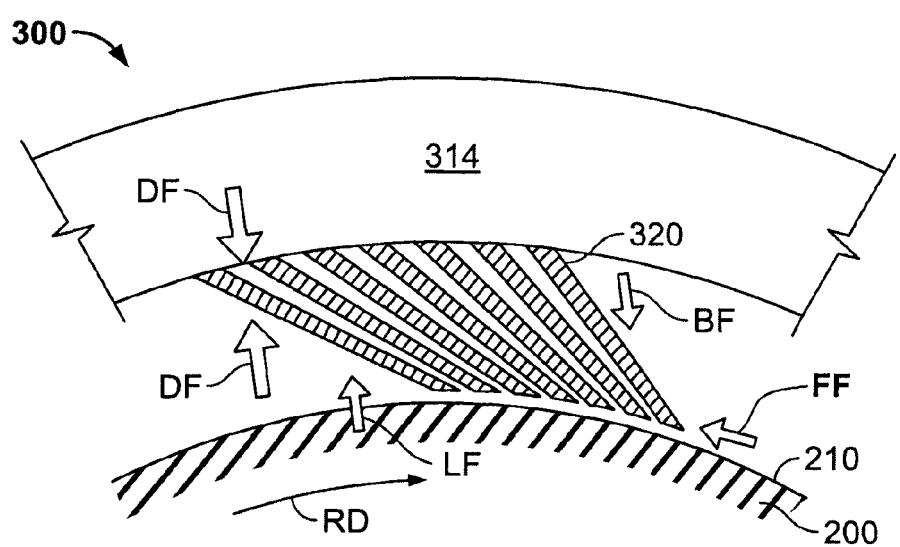
FIG. 3 is an enlarged front cross-sectional view of the seal assembly shown in FIG. 2.

FIG. 3 is an enlarged front cross-sectional view of seal assembly 300. In the exemplary embodiment, leaf tips 322 are spaced from rotary component 200 during a rotation of rotary component 200 in rotational direction RD. Various rotary machine operations such as, but not limited to starting, turning, or stopping the rotary machine, may cause radial displacement of stationary component 100 and rotary component 200 from their original start location.

For example, known rotors and stators have different responses in various operating stages of a rotary machine. At start-up, for example, the rotor may rotate in a rotational direction, such as rotational direction RD, and may move radially towards the stator. As operating temperatures increase, the stator may then move radially away from the rotor through thermal expansion. At shut-down of the rotary machine, the growth process may be reversed. Therefore, at least some known seal assemblies radially adjust and actuate leaf plates in an attempt to control the clearance defined between the leaf tips and a rotary component. However, at least some known radially-adjustable leaf plate actuation mechanisms are generally limited and less accurate in facilitating balancing of forces such as, but not limited to, leaf/rotor contact forces ("BF"), hydrodynamic lifting forces ("LF"), differential pressure forces ("DF"), and frictional forces ("FF").

In the exemplary embodiment, the above-referenced forces also act on leaf plates 320, and generally change during various operating stages of rotary machine 10. Compared to known seal assemblies, seal assembly 300 facilitates enhanced control of the clearance defined between leaf tips 322 and rotary component 200 by providing an axially-adjustable device. As a result, seal assembly 300 provides enhanced control of steam or air leakage between leaf tips 322 and rotary component 200 during various operating stages of rotary machine 10, as is described in more detail below.

Figure 4:
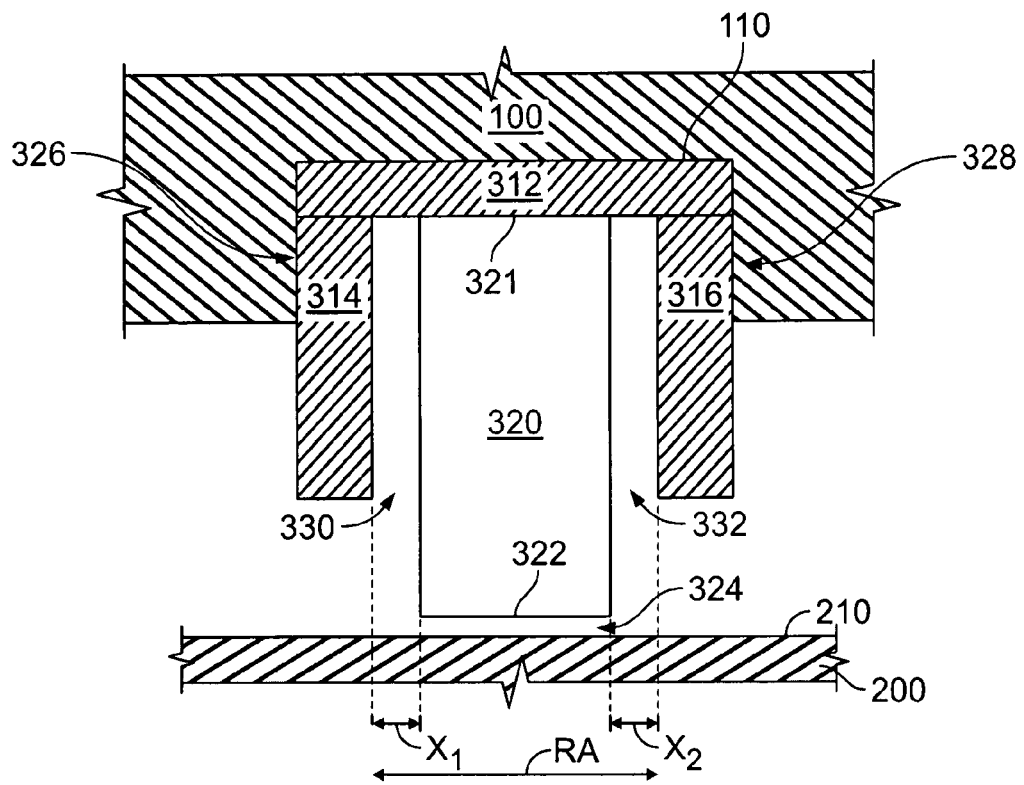
FIG. 4 is a schematic illustration of the seal assembly shown in FIG. 3.

FIG. 4 is a schematic illustration of seal assembly 300. In the exemplary embodiment, a first axial gap 330 having a width $X_1$ is defined between front wall 314 and leaf plates 320. In addition, a second axial gap 332 having a width $X_2$ is defined between leaf plates 320 and back wall 316. By varying widths $X_1$ and $X_2$ of respective gaps 330 and 332, steam flow or airflow through the respective gaps 330 and 332 may be controlled. Moreover, a clearance 324 between leaf tips 322 and rotary component 200 may also be varied during various operating stages of rotary machine 10.

In the exemplary embodiment, seal assembly 300 includes axially-adjustable actuating mechanisms 326 and 328 formed as front wall 314 and back wall 316 of seal housing 310. For example, in one embodiment, front wall 314 and back wall 316 are fabricated from shape memory alloys such as, but not limited to, nickel-titanium, silver-cadmium, copper-aluminum-nickel, copper-zinc-aluminum, and/or iron-manganese-silicon alloys. Such shape memory alloys return to their original shape after being subjected to deformation and/or strain as a result of being heated to temperatures that are higher than a transformation temperature of the alloy. More specifically, shape memory alloys are metals having material properties that change shape, position, stiffness, natural frequency, and/or other mechanical characteristics in response to temperature and/or electromagnetic field changes.

For example, such shaped metal alloys undergo phase changes that rearrange atoms within a crystal structure of the alloy so that the alloy may transition between an original shape and deformed shapes. Because shape memory alloys undergo crystalline phase changes at certain phase transformation temperatures, shape memory alloys enable large forces, which are generated when encountering any resistance during transformation, and enable large movement actuation to recover large strains.

By varying widths $X_1$ and $X_2$ of gaps 330 and 332, steam flow or airflow acting on leaf plates 320 is also varied. As a result, the pressure distribution in seal assembly 300 is varied which causes movement, i.e., lifting and lowering, of leaf plates 320. For example, if gap width $X_1$ is greater than gap width $X_2$, then an overall pressure distribution may cause leaf tips 322 to move toward rotary component 200. In contrast, if gap width $X_1$ is less than gap width $X_2$, then an overall lifting force may be generated to shift leaf tips 322 closer to seal housing 310. As such, by varying the width $X_1$ of gap 330 and the width $X_2$ of gap 332, the overall pressure distribution acting on seal assembly 300 may be controlled and selectively distributed between front wall 314, back wall 316, and leaf plates 320.

The table below shows exemplary results of an analytical analysis showing the effects of varying the distance between axial gap 330 ("front gap") and axial gap 332 ("back plate gap"). As shown in the table, changes in mass flow rates and torque values may be obtained by adjusting front gap and/or back plate gap.

adjustable seal assemblies. Further, by axially adjusting and actuating front wall 314 and back wall 316, clearance 324 may be more accurately adjusted to a desired height based on an operating stage of rotary machine 10 as compared to some known radially-adjustable seal assemblies.

Figure 5:
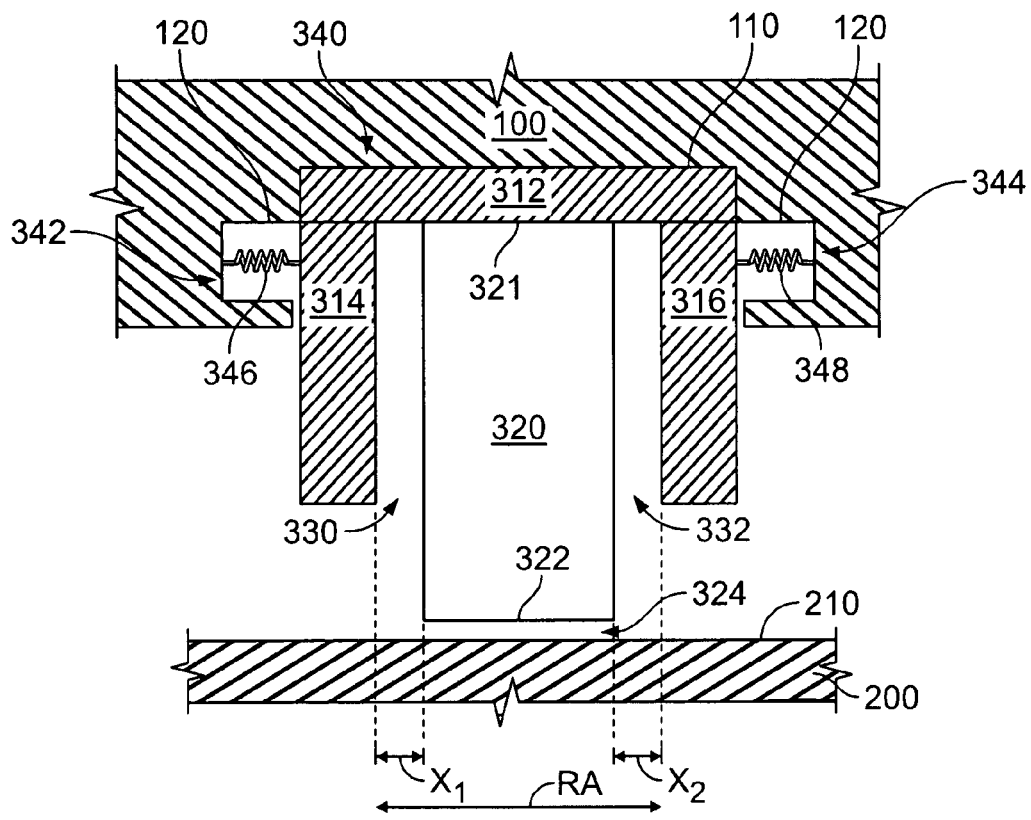
FIG. 5 is a schematic illustration of an alternative embodiment of a seal assembly that may be used with the rotary machine shown in FIG. 1.

FIG. 5 is a schematic illustration of an alternative embodiment of a seal assembly 340. Specifically, the seal assembly shown in FIG. 5 is the same seal assembly shown in FIG. 4, with the exception of a few component changes, described in more detail below. As such, components shown in FIG. 5 that are identical to components illustrated in FIG. 4 are identified in FIG. 5 using the same reference numerals used in FIG. 4. More specifically, in the embodiment illustrated in FIG. 5, seal assembly 340 includes axially-adjustable actuating mechanisms 342 and 344 coupled to front wall 314 and back wall 316 of seal housing 310 instead of shape memory alloys illustrated in FIG. 4. For example, front wall 314 and back wall 316 may be coupled to stationary component 100 via biasing members 346 and 348 positioned in recesses 120 defined in stationary component 100. By axially adjusting and actuating front wall 314 and back wall 316, a controlled pressure distribution and clearance 324 between leaf tips 322 and rotary component 200 may be facilitated to provide the advantages discussed above with respect to FIG. 4.

Figure 6:
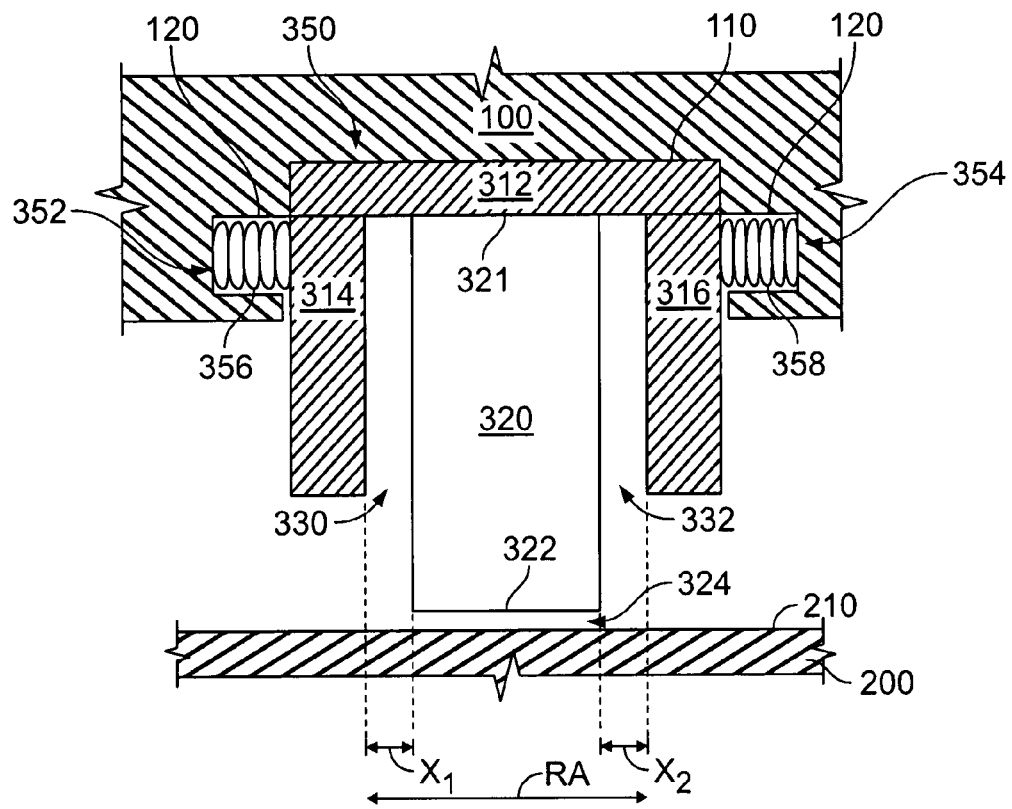
FIG. 6 is a schematic illustration of another alternative embodiment of a seal assembly that may be used with the rotary machine shown in FIG. 1.

FIG. 6 is a schematic illustration of another alternative embodiment of a seal assembly 350. Specifically, the seal assembly shown in FIG. 6 is the same seal assembly shown in FIG. 4, with the exception of a few component changes, described in more detail below. As such, components shown

| S.NO | Front Gap mm | Back Plate Gap mm | Tip Gap Micron | DP psi | Torque N-m SL1 | SL2 | SL3 | Total | Flow kg/s |
|---|---|---|---|---|---|---|---|---|---|
| 1 | 0.05 | 0.15 | 1 | 50 | 3.937E−01 | −3.957E−01 | 2.950E−03 | 9.722E−04 | 1.662E−05 |
| 2 | 0.1 | 0.1 | 1 | 50 | 6.559E−01 | −6.598E−01 | 3.118E−03 | −7.248E−04 | 2.051E−05 |
| 3 | 0.15 | 0.05 | 1 | 50 | 7.854E−01 | −7.892E−01 | 3.269E−03 | −6.055E−04 | 1.523E−05 |
| 4 | 0.05 | 0.15 | 1 | 500 | 5.390E+00 | −5.420E+00 | 3.156E−02 | 1.561E−03 | 2.601E−04 |
| 5 | 0.1 | 0.1 | 1 | 500 | 7.351E+00 | −7.394E+00 | 3.548E−02 | −7.506E−03 | 2.829E−04 |
| 6 | 0.15 | 0.5 | 1 | 500 | 8.394E+00 | −8.443E+00 | 3.880E−02 | −9.596E−03 | 2.420E−04 |
| 7 | 0.05 | 0.15 | 10 | 50 | 3.925E−01 | −3.944E−01 | 2.973E−03 | −1.033E−03 | 1.610E−05 |
| 8 | 0.1 | 0.1 | 10 | 50 | 6.555E−01 | −6.594E−01 | 3.117E−03 | −7.263E−04 | 2.009E−05 |
| 9 | 0.15 | 0.05 | 10 | 50 | 7.854E−01 | −7.892E−01 | 3.269E−03 | −6.055E−04 | 1.483E−05 |
| 10 | 0.05 | 0.15 | 10 | 500 | 5.400E+00 | −5.430E+00 | 3.183E−02 | 2.216E−03 | 2.493E−04 |
| 11 | 0.1 | 0.1 | 10 | 500 | 7.322E+00 | −7.364E+00 | 3.529E−02 | −6.998E−03 | 2.762E−04 |
| 12 | 0.15 | 0.05 | 10 | 500 | 8.369E+00 | −8.418E+00 | 3.852E−02 | −1.036E−02 | 2.352E−04 |

For example, in the table, a negative total torque value indicates an overall lowering force for lowering leaf tips 322 when front gap 330 is wider than back plate gap 332. On the other hand, a positive total torque value indicates an overall lifting force for lifting leaf tips 322 when front gap 330 is smaller than back plate gap 332. However, both types of forces are desirable to facilitate optimizing clearances at different machine stages such as, but limited to, machine start-up, operation, and shut-down cycles.

By axially adjusting and actuating front wall 314 and back wall 316, a pressure drop may be distributed between front wall 314, back wall 316, and leaf plates 322 as compared to some known radially-adjustable seal assemblies in which a majority of the pressure drop is substantially experienced by the leaf plates. Also, during axial adjustment, axially-adjustable front and back walls 314 and 316 are subjected to less frictional forces between the seal housing 310 and stationary component cavity 110 as compared to some known radiallyin FIG. 6 that are identical to components illustrated in FIG. 4 are identified in FIG. 6 using the same reference numerals used in FIG. 4. More specifically, in the embodiment illustrated in FIG. 6, seal assembly 350 includes axially-adjustable actuating mechanisms 352 and 354 coupled to front wall 314 and back wall 316 of seal housing 310 instead of shape memory alloys illustrated in FIG. 4. For example, front wall 314 and back wall 316 may be coupled to stationary component 100 via bellows devices 356 and 358 positioned in recesses 120 defined in stationary component 100. By axially adjusting and actuating front wall 314 and back wall 316, a controlled pressure distribution and clearance 324 between leaf tips 322 and rotary component may be facilitated to provide the advantages discussed above with respect to FIG. 4.

Figure 7:
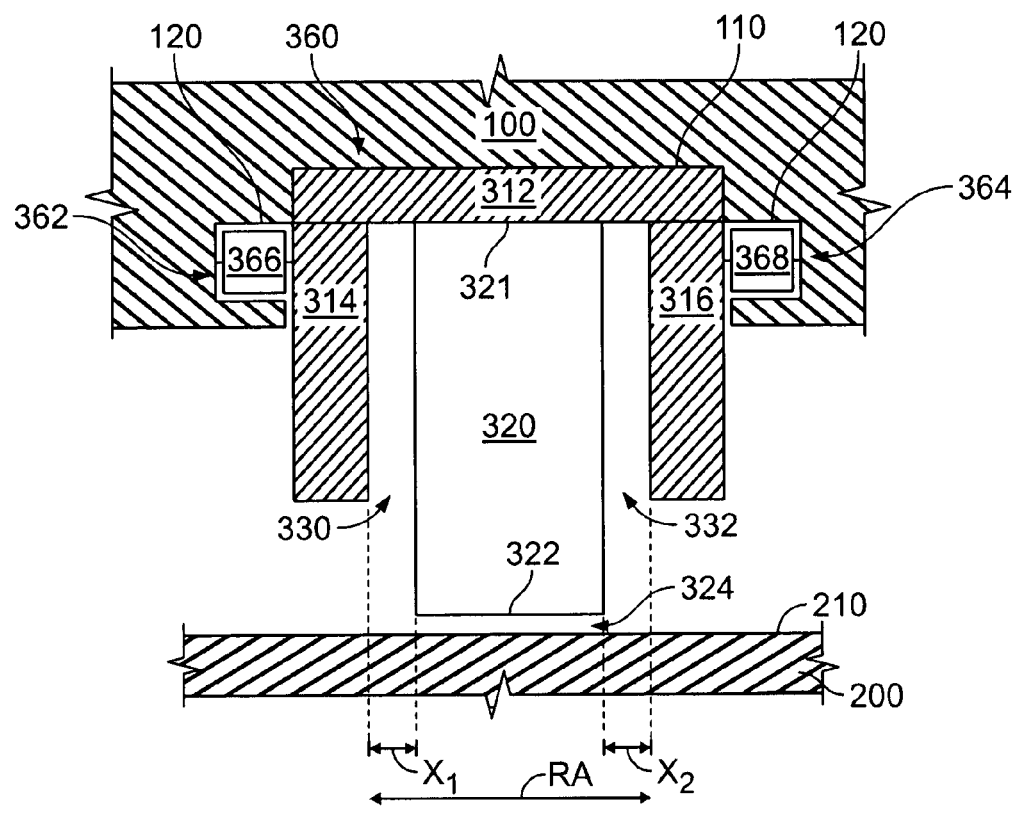
FIG. 7 is schematic illustration of yet another alternative exemplary seal assembly that may be used with the rotary machine shown in FIG. 1.

FIG. 7 is a schematic illustration of another alternative embodiment of a seal assembly 360. Specifically, the seal assembly shown in FIG. 7 is the same seal assembly shown in FIG. 4, with the exception of a few component changes, described in more detail below. As such, components shown in FIG. 7 that are identical to components illustrated in FIG. 4 are identified in FIG. 7 using the same reference numerals used in FIG. 4. More specifically, in the embodiment illustrated in FIG. 7, seal assembly 360 includes axially-adjustable actuating mechanisms 362 and 364 coupled to front wall 314 and back wall 316 of seal housing 310 instead of shape memory alloys illustrated in FIG. 4. For example, front wall 314 and back wall 316 may be coupled to stationary component 100 via piezo-electric devices 366 and 368 positioned in recesses 120 defined in stationary component 100. By axially adjusting and actuating front wall 314 and back wall 316, a pressure distribution and a clearance between leaf tips 322 and rotary component may be controlled to provide the advantages discussed above with respect to FIG. 4.

Although axially-adjustable actuation mechanisms 326, 328, 342, 344, 352, 354, 362, and 364 including shaped memory alloys, biasing members, bellows devices, and piezo-electric devices have been described, it should be appreciated that the axially-adjustable actuation mechanisms 326, 328, 342, 344, 352, 354, 362, and 364 may include any device that axially adjusts or actuates front wall 314 and back wall 316 as described herein.

Although the stationary component 100 is described as including recesses 120 defined in stationary component 100 to facilitate positioning axially-adjustable actuating mechanisms 342, 344, 352, 354, 362, and 364 therein, it should be appreciated that the axially-adjustable actuating mechanisms 342, 344, 352, 354, 362, and 364 may be coupled directly to any surface of stationary component 100 provided that the axially-adjustable actuating mechanisms 342, 344, 352, 354, 362, and 364 are oriented and configured to axially adjust or actuate front wall 314 and back wall 316.

In each exemplary embodiment, the above-described seal assemblies include axially-adjustable actuating mechanisms that facilitate maintaining a pressure differential in a rotary machine. As a result of axial actuation of front and/or back walls, a significantly lower actuating force is required as compared to actuating forces that are generally required with known radially actuating seal assemblies. Therefore, the seal assemblies of the present application include axially-adjustable actuation mechanisms that facilitate increasing functionality, lower cost and/or lower complexity.

Exemplary embodiments of seal assemblies and axial actuating mechanisms are described above in detail. The seal assemblies and axial actuating mechanisms are not limited to use with the specific rotary machine embodiments described herein, but rather, the seal assemblies and/or axial actuating mechanisms can be utilized independently and separately from other rotary machine components described herein. Moreover, the invention is not limited to the embodiments of the seal assemblies and axial actuating mechanisms described above in detail. Rather, other variations of seal assembly and axial actuating mechanism embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for sealing a rotary machine including a rotary component and a stationary component, said method comprising:
    providing a plurality of flexible leaf plates in an opening defined between a pair of spaced walls that include an adjustable front wall and an adjustable back wall that is opposed to the front wall;
    adjusting a width of the opening by axially adjusting at least one of the front and back walls with respect to a central rotational axis of the rotary component such that pressurized fluid flow acting upon the plurality of flexible leaf plates controls a distance between the plurality of flexible leaf plates and the rotary component; and
    positioning a top wall, the front wall, the back wall, and the leaf plates within a cavity defined in the stationary component, wherein the top wall extends from the front wall to the back wall.

2. A method in accordance with claim 1 further comprising:
    defining a first gap to have a first width measured between the front wall and the leaf plates;
    defining a second gap to have a second width measured between the leaf plates and the back wall, wherein the second gap is subjected to pressures that are substantially less than those exposed to the first gap; and
    adjusting the first gap width by axially moving the front wall, and adjusting the second gap width by axially moving the back wall.

3. A method in accordance with claim 1 further comprising operatively coupling an adjustment mechanism to at least one of the front wall and the back wall to axially move at least one of the front wall and the back wall.

4. A method in accordance with claim 3 wherein operatively coupling an adjustment mechanism comprises coupling at least one of a biasing member, a bellows device, a piezoelectric actuator, and a shape memory alloy to at least one of the front wall and the back wall.

5. A method in accordance with claim 1 further comprising circumferentially arranging the leaf plates about the central rotational axis of the rotary component.

6. A method in accordance with claim 1 further comprising circumferentially staggering the leaf plates.

7. A seal assembly for a rotary machine including a rotary component and a stationary component, said seal assembly comprising:
    a top wall and a pair of spaced walls comprising a moveable front wall and a moveable back wall, said top wall coupling said back wall opposite said front wall such that an opening is defined therebetween;
    a plurality of flexible leaf plates disposed in said opening, said front and back walls are axially adjustable with respect to a central rotational axis of said rotary component to selectively adjust a width of said opening such that pressurized fluid flow acting upon said plurality of flexible leaf plates controls a distance between said plurality of flexible leaf plates and said rotary component, wherein said top wall, said front wall, said back wall, and said leaf plates are positioned within a cavity defined in the stationary component; and
    an adjustment mechanism coupled to at least one of said front wall and said back wall to selectively move at least one of said front wall and said back wall.

8. A seal assembly in accordance with claim 7 wherein said front wall and said leaf plates define a first gap having a first width defined therebetween, said first gap subjected to a first operating pressure, said leaf plates and said back wall define a second gap having a second width therebetween, said second gap subjected to a second operating pressure that is substantially less than the first operating pressure, and wherein axial movement of said front wall selectively adjusts said first gap width, and axial movement of said back wall selectively adjusts said second gap width.

9. A seal assembly in accordance with claim 7 wherein said adjustment mechanism comprises at least one of a biasing member, a bellows device, a piezoelectric actuator, and a shape memory alloy operatively connected to at least one of said front wall and said back wall.

10. A seal assembly in accordance with claim 7 wherein said leaf plates are circumferentially arranged about the central rotational axis of the rotary component.

11. A seal assembly in accordance with claim 7 wherein said leaf plates are circumferentially staggered about the central rotational axis of the rotary component.

12. A rotary machine comprising:
   a stationary component fixed against rotation;
   a rotary component including an axis of rotation, said rotary component opposing said stationary component; and
   a seal assembly coupled to said stationary component, said seal assembly comprising:
      a top wall and a pair of spaced walls comprising a moveable front wall and a moveable back wall, said top wall coupling said back wall opposite said front wall such that an opening is defined therebetween; and
      a plurality of flexible leaf plates disposed in said opening, wherein said front and back walls are axially adjustable with respect to a central rotational axis of said rotary component to selectively adjust a width of said opening such that pressurized fluid flow acting upon said plurality of flexible leaf plates controls a distance between said plurality of flexible leaf plates and said rotary component, wherein said front wall, said back wall, and said leaf plates are positioned within a cavity defined in the stationary component; and
      an adjustment mechanism coupled to at least one of said front wall and said back wall to selectively move at least one of said front wall and said back wall.

13. A rotary machine in accordance with claim 12 wherein said front wall and said leaf plates define a first gap having a first width defined therebetween, said first gap subjected to a first operating pressure, said leaf plates and said back wall define a second gap having a second width defined therebetween, said second gap subjected to a second operating pressure that is substantially less than the first operating pressure, and wherein axial movement of said front wall selectively adjusts said first gap width, and axial movement of said back wall selectively adjusts said second gap width.

* * * * *